(12) United States Patent
Law et al.

(10) Patent No.: US 9,955,820 B2
(45) Date of Patent: May 1, 2018

(54) BLADE HOLDER ASSEMBLY FOR BLENDER

(71) Applicant: Huiyang Allan Plastic & Electric Industries Co., Limited, Guangdong Province (CN)

(72) Inventors: Sam Law, Guangdong Province (CN); Wenjun Zhu, Guangdong Province (CN); Zhiqiang Zhang, Guangdong Province (CN)

( * ) Notice: Subject to any disclaimer, the term of this patent is extended or adjusted under 35 U.S.C. 154(b) by 356 days.

(21) Appl. No.: 14/829,643

(22) Filed: Aug. 19, 2015

(65) Prior Publication Data

US 2016/0287017 A1    Oct. 6, 2016

(30) Foreign Application Priority Data

Apr. 3, 2015   (CN) .......................... 2015 1 0154908

(51) Int. Cl.
*A47J 43/00*   (2006.01)
*A47J 43/07*   (2006.01)
*A47J 43/046*  (2006.01)

(52) U.S. Cl.
CPC .......... *A47J 43/0716* (2013.01); *A47J 43/046* (2013.01); *A47J 43/0727* (2013.01)

(58) Field of Classification Search
CPC .. A47J 43/0716; A47J 43/0722; A47J 43/046; A47J 43/044; A47J 43/0727
USPC ........................................... 241/282.1, 282.2
See application file for complete search history.

(56) References Cited

U.S. PATENT DOCUMENTS

| | | | | |
|---|---|---|---|---|
| 2,304,476 A * | 12/1942 | Poplawski | ............ | A47J 43/046 222/216 |
| 5,674,026 A * | 10/1997 | Ishibashi | ................. | F16C 3/035 403/357 |
| 6,616,324 B1 * | 9/2003 | Planca | ..................... | A47J 43/06 241/101.2 |
| 6,715,706 B1 * | 4/2004 | Planca | ................ | A47J 43/0716 241/282.2 |
| 7,387,269 B2 * | 6/2008 | Mally | ................... | A47J 43/085 241/282.1 |
| 7,600,706 B2 * | 10/2009 | Huang | ................ | A47J 43/0777 241/282.2 |
| 7,690,592 B2 * | 4/2010 | Ferraby | ............... | A47J 43/0777 241/101.01 |
| 8,087,818 B2 * | 1/2012 | Drees | .................... | A47J 43/085 366/199 |

(Continued)

*Primary Examiner* — Faye Francis
(74) *Attorney, Agent, or Firm* — Prakash Nama; Global IP Services, PLLC

(57) ABSTRACT

A blade holder assembly for blender having a cup body arranged on a cup base; the cup base connects the cup body and a blade holder component; the blade holder component has a blade holder below and connected with the cup base; a handle is arranged on the bottom of the blade holder; connecting members are arranged on both ends of the handle; a locator is on the bottom of the blade holder; a connector is arranged at the center of the locator; a guide bone is on the edge of the blade holder, and a rotary button is in the guide bone; on the rotary fastener, two fastening members are arranged; the connecting members are connected with the rotary fastener; a guide slot is on the inner edge of the cup base; in the guide slot, a convex button is arranged for fastening the rotary fastener.

8 Claims, 6 Drawing Sheets

(56) References Cited

U.S. PATENT DOCUMENTS

| | | | | |
|---|---|---|---|---|
| 8,226,021 | B2* | 7/2012 | Wilson | A47J 43/0716 241/282.2 |
| 9,283,528 | B2* | 3/2016 | Thai | A47J 43/046 |
| 9,500,235 | B2* | 11/2016 | Kanning | F16D 1/10 |
| 2002/0012288 | A1* | 1/2002 | Masip | A47J 43/046 366/205 |
| 2006/0275075 | A1* | 12/2006 | Katz | A47J 43/085 403/356 |
| 2007/0140048 | A1* | 6/2007 | Ismail | A47J 43/085 366/205 |
| 2009/0129200 | A1* | 5/2009 | Breviere | A47J 43/0716 366/205 |
| 2009/0168593 | A1* | 7/2009 | Wulf | A47J 43/042 366/206 |
| 2011/0096619 | A1* | 4/2011 | Pryor, Jr. | A47J 43/0766 366/205 |
| 2011/0149677 | A1* | 6/2011 | Davis | A47J 43/042 366/205 |
| 2014/0239107 | A1* | 8/2014 | Upston | A47J 43/0722 241/282.2 |
| 2014/0247685 | A1* | 9/2014 | Roberts | A47J 43/0716 366/205 |
| 2015/0036459 | A1* | 2/2015 | Holm | A47J 43/0716 366/205 |
| 2016/0174770 | A1* | 6/2016 | Lee | A47J 43/0716 464/179 |
| 2017/0273510 | A1* | 9/2017 | Sapire | A47J 43/0777 |

* cited by examiner

BLADE HOLDER ASSEMBLY FOR BLENDER

BACKGROUND OF THE INVENTION

The present invention relates to a small kitchen appliance, in particular to a blade holder assembly for blender.

Blenders available nowadays in the market generally include two kinds of structures. The first kind is that the blade holder and the cup body are in a one-piece structure and cannot be separated from each other, and it is difficult to clean the inner part of the cup and easy to breed bacteria and it is thus inhygenic. Furthermore, the finger tends to get hurt during the cleaning. The second kind is that the blade holder can be detached from the cup body and the blade holder is connected with the cup body by means of a screw-thread connection. There is a waterproof silicone ring arranged between the blade holder and the cup body, so when rotating the blade holder, it is hard to rotated due to a high friction force generated by the silicone ring. Meanwhile, if the blade holder and the cup body are not screwed tightly, it may leak water on the connecting point between the cup body and the blade holder, and safety risks exist. The above two blenders both have the disadvantages of an inconvenient operation and insecurity during use and an inadequate stability of the blade holder. There is hence a need for a further improvement.

BRIEF SUMMARY OF THE INVENTION

In order to solve the above problems, the invention provides a blade holder assembly for blender, which can solve the problems of existing blade holder assemblies of the blender, such as a complex structure, inconvenience and insecurity and so on.

The technical problem to be solved by the invention can be solved by the following technical solution: a blade holder assembly for blender, comprising a cup body, a cup base and a blade holder component, the cup body is arranged on the cup base, and the cup base connects the cup body with the blade holder component; the blade holder component comprises a blade holder arranged below the cup base and connected with the cup base; a handle is arranged on the bottom of the blade holder; connecting members are arranged on both ends of the handle; a locator is arranged on the bottom of the blade holder to locate the relative position of the handle and the blade holder; a connector is arranged at the center of the locator; and the blade holder, the locator and the connector are coaxial; a guide bone is arranged on the edge of the blade holder, and a rotary button is arranged in the guide bone; on the rotary fastener, two opposing fastening members are arranged; the connecting members at both ends of the handle are connected with the rotary fastener; a guide slot is arranged on the inner edge of the cup base to connect with the guide bone; in the guide slot, a convex button is arranged for fastening the rotary fastener.

Preferably, a locating slot is arranged on the edge of the blade holder, and on said locator, a locating bone and a locating pole are arranged that form a one-piece structure with the locator; the locating bone is engaged inside the locating slot, and the locating pole and the connecting members at the both ends of the handle are arranged inside the locating bone.

Preferably, four "H"-shaped fastening positions for fixing are arranged on the bottom of the blade holder, and on the locator, four engaging positions are arranged to engage with fastening positions.

Preferably, an engaging slot is arranged in the cup base for connecting with the locating slot.

Preferably, the convex button is polygonal, said fastening member is arranged on the edge of the rotary fastener, and the inner edge of the fastening member form-fits with the outer edge of the convex button.

Preferably, the blade holder component further comprises a screw which fixes the rotary fastener on the blade holder.

Preferably, on two sides of the handle two protrusions are respectively arranged.

More preferably, on the blade holder, a blending blade is arranged, and on edge of the surface of the blade holder, a waterproof ring is arranged.

The present invention relates to a blade holder assembly for blender which has changed the connection type between handle and the blade holder on the blade holder component and between the blade holder and the cup base, and thus facilities the mounting and demounting of the whole blade holder assembly and is easy to operate, has a high security and easy to be widely employed. The invention makes use of rotation of the handle to bring the rotary fastener into rotation, and then the inner edge of the fastening member on the rotary fastener rotates along the outer edge of the convex button on the cup base and reaches locking position or separation position, so that a locking and a separation of the cup body with the blade holder is realized, and the whole structure is simple, easy to operate, and convenient. It is easy to detach the blade holder for cleaning when cleaning the blender blades and it is easy and convenient to operate and clean. The arrangement of the locator makes it easy to assemble the blade holder, and it is easy to locate.

DETAILED DESCRIPTION OF THE INVENTION

Figure 1:
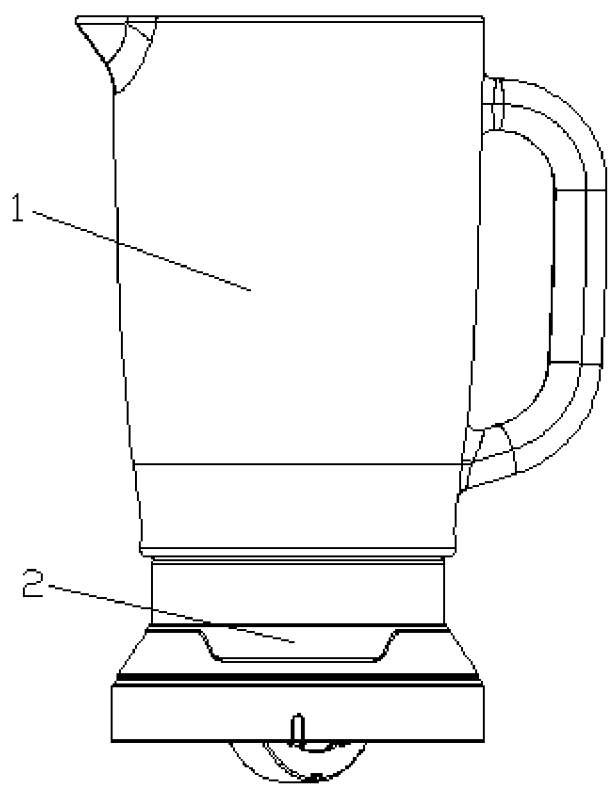
FIG. 1 is an overall structural view of the present invention.
Figure 2:
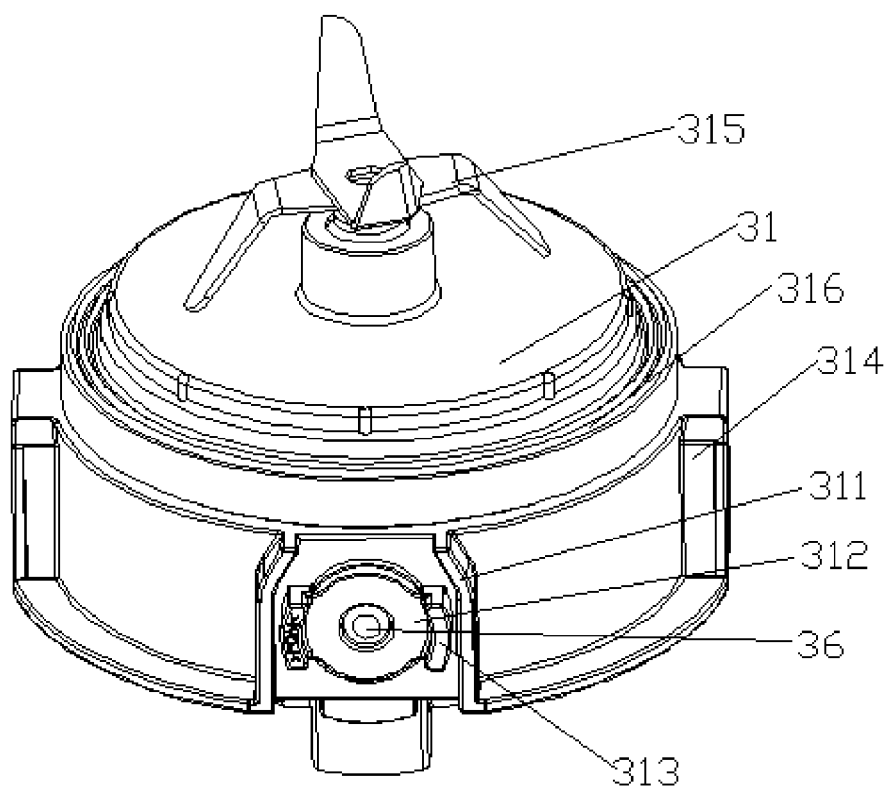
FIG. 2 is an overall structural front view of the blade holder component of the present invention.

For a better understanding of the technical solutions of the invention for those skilled in the art, the structure and principle of the invention are further described with reference to the appended drawings and embodiments.

Referring to FIGS. 1-7, a blade holder assembly for blender includes a cup body 1, a cup base 2 and a blade holder component 3, the cup body 1 is arranged on the cup base 2 and the cup base 2 connects the cup body 1 and the blade holder component 3. The blade holder component 3 includes a blade holder 31 arranged just below the cup base and connected with the cup base; on the blade holder a blending blade 315 is arranged, and a waterproof ring 316 is arranged on the upper surface of the blade holder. A handle 32 is vertically arranged on the bottom of the blade holder, and on both sides of the handle 32, two protrusions 37 are respectively arranged. At both ends of the handle 32, a connecting member 33 is arranged. A locator 34 is arranged on the bottom of the blade holder to locate the relative position of the handle and the blade holder, and a connector 35 is arranged at the center of the blade holder. The blade holder, the locator and the connector are coaxially arranged, and the connector is arranged centrally in the blade holder. A guide bone 311 is arranged on the edge of the blade holder and in the guide bone a rotary fastener 312 is arranged on which two opposing fastening member 313 are arranged which are arranged on the edge of the rotary fastener. The connecting members at both ends of the handle are connected with the rotary fastener. A guide slot 21 is arranged on the inner edge of the cup base to connect with the guide bone, and in the guide slot, a polygonal convex button 22 is arranged that engages with the rotary fastener. The inner edge of the fastening member 313 form-fits with the outer edge of the convex button 22. The blade holder component further includes a screw 36 which fixes the rotary fastener on the blade holder.

A locating slot 314 is arranged on the edge of the blade holder, and on said locator 34, two step-shaped locating bones 341 and two locating poles 342 are arranged which form a one-piece structure with the locator, and the locating bones are engaged inside the locating slot, and the locating poles and the connecting members at the both ends of the handle are engaged inside the locating bone. Four "H"-shaped fastening positions 344 for fixing are arranged on the bottom of the blade holder, and engaging positions 343 are arranged on the locator to engage with the fastening positions 344. When the fastening positions 344 and the engaging positions 343 are interlocked, the entire locator is locked on the bottom of the blade holder tightly. In the cup base, an engaging slot 23 is arranged which is connected with the locating slot 314.

Figure 3:
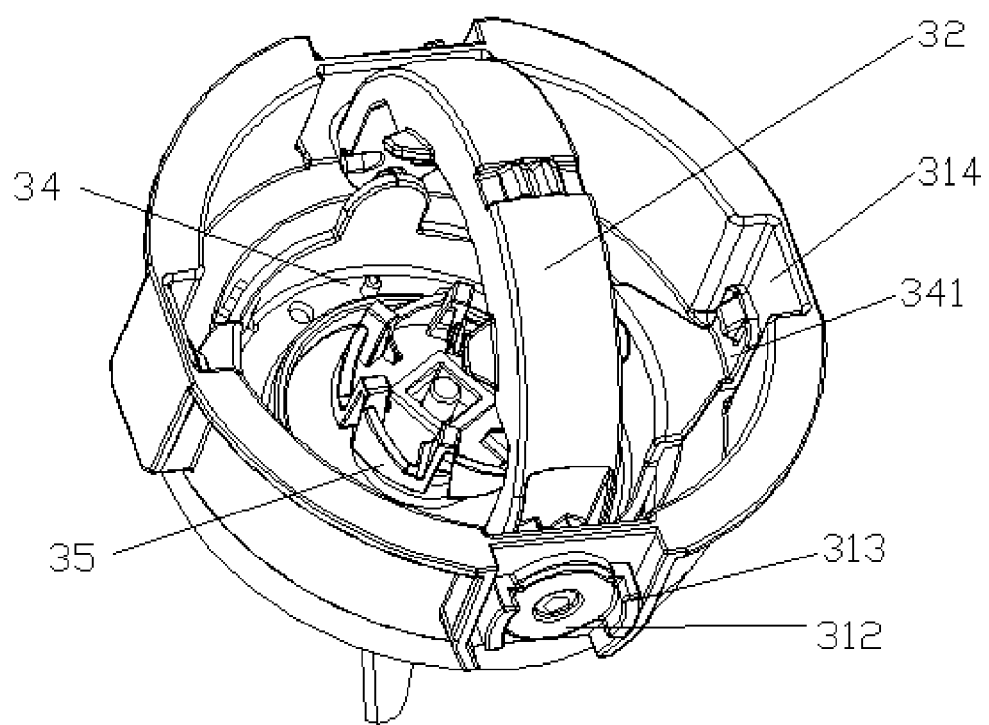
FIG. 3 is an overall structural upside-down view in a separation state of the blade holder component of the present invention.
Figure 4:
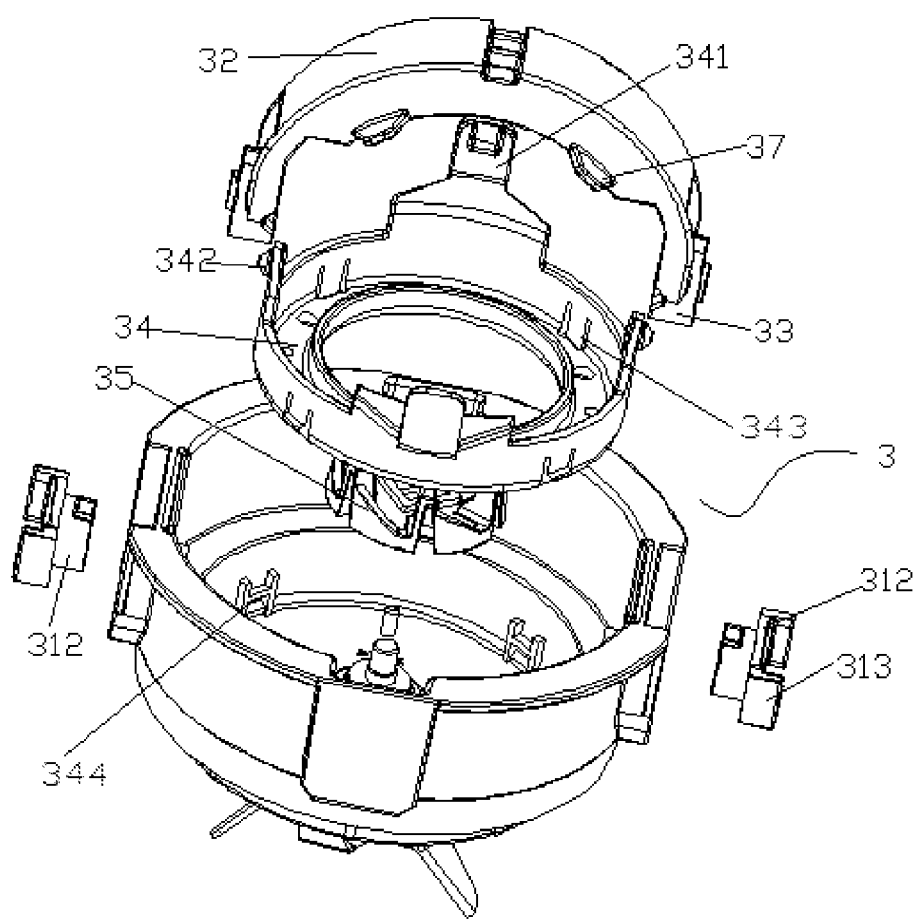
FIG. 4 is an overall structural upside-down explosive view of the blade holder component of the present invention.
Figure 5:
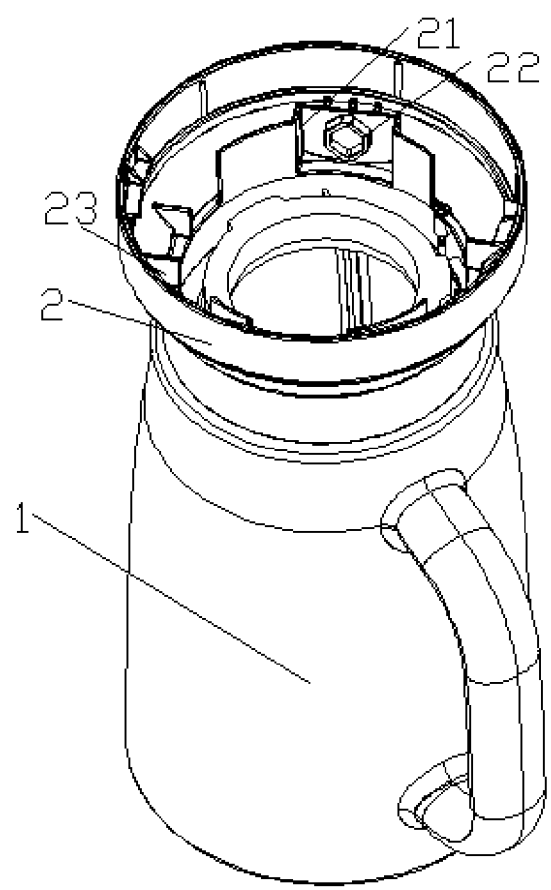
FIG. 5 is a structural view of the cup base of the present invention.
Figure 6:
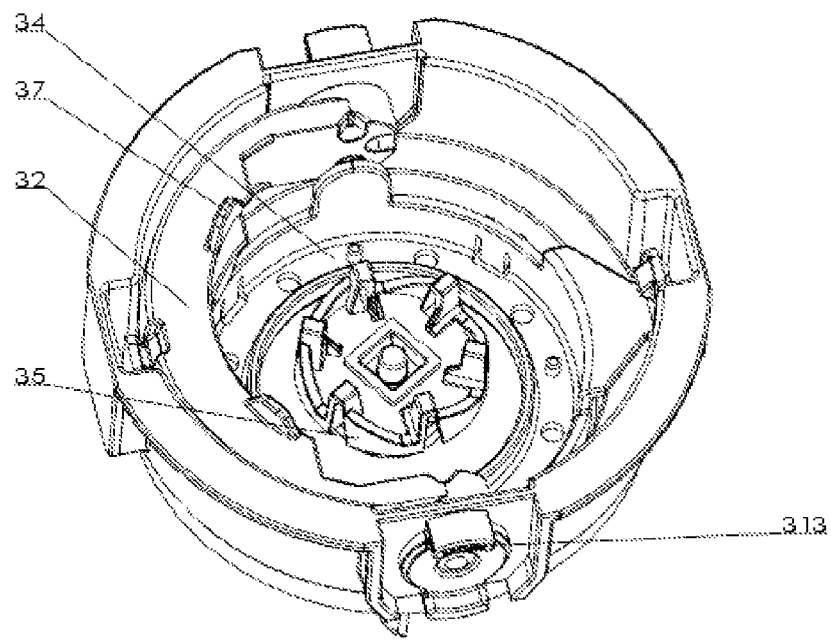
FIG. 6 is an overall structural upside-down view in a locking state of the blade holder component of the present invention.

The present invention is implemented as follows: when holding the handle and when the plane in which the handle lies is perpendicular to the plane in which the blade holder lies, the blade holder is mounted into the cup base after the guide bone on the blade holder, which is equipped with rotary fastener, is aligned with the guide slot on the cup base. At this point of time, the guide bone, the locating slot on the blade holder are respectively inserted into the guide slot and the engaging slot on the cup base, and the fastening member on the rotary fastener is engaged on the vertical edge of the polygonal convex button. As shown in FIG. 3, at this point of time, the rotary fastener is in an unlocked position and the blade holder is separated from the cup base. The handle is pushed in bottom left direction or bottom right direction so that the handle is embedded completely into the edge of the blade holder and lies in the same plane with the blade holder. The rotation of the handle also brings the rotary fastener into rotation, and the fastening member on the rotary fastener rotates along the edge of the convex button and reaches the horizontal edge of the polygonal convex button. As shown in FIG. 6, at this point of time, the rotary fastener lies in a locked position and the blade holder is interlocked with the cup base. Likewise, when the handle is separated so that it returns to a vertical state, the blade holder can be separated from the cup base.

Figure 7:
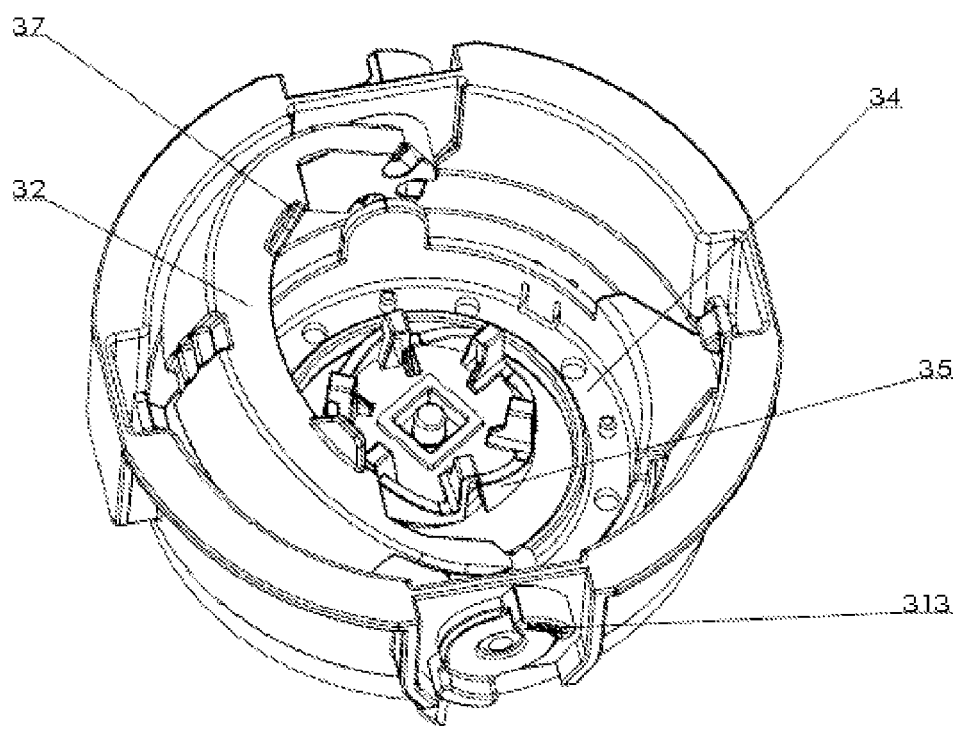
FIG. 7 is an overall structural upside-down view in a half locking state of the blade holder component of the present invention.

When the handle is not completely put into the blade holder as shown in FIG. 7, the handle is not located in the same plane as the blade holder, the cup base is not completely locked by the blade holder. When the whole cup body along with the blade holder is put into an arbitrary plane, the protrusion on the handle exactly goes into contact with the plane, and because of the pushing force of the plane, the protrusion is pushed by reacting pushing force of the plane, so that the handle is completely put into the blade holder. At this point of time, the blade holder is completely interlocked with the cup base, so that it is avoided that the blade holder is not interlocked with the cup base due to misoperation and a leakage of fluid occurs.

The present invention relates to a blade holder assembly for blender which has changed the connection type between handle and the blade holder on the blade holder component and between the blade holder and the cup base, and thus facilities the mounting and demounting of the whole blade holder assembly and is easy to operate, has a high security and easy to be widely employed. The invention makes use of rotation of the handle to bring the rotary fastener into rotation, and then the inner edge of the fastening member on the rotary fastener rotates along the outer edge of the convex button on the cup base and reaches locking position or separation position, so that a locking and a separation of the cup body with the blade holder is realized, and the whole structure is simple, easy to operate, and convenient. It is easy to detach the blade holder for cleaning when cleaning the blender blades and it is easy and convenient to operate and clean. The arrangement of the locator makes it easy to assemble the blade holder, and it is easy to locate.

The above are the preferred embodiments of the represent invention, and it should be noted that, without deviating from the spirit and essential of the present invention, a person skilled in the art is able to make various corresponding changes and modifications according to the present invention, but these respective changes and modifications should also fall within the protecting scope of the present invention.

What is claimed is:

1. A blade holder assembly for blender, comprising a cup body (1), a cup base (2) and a blade holder component (3), the cup body (1) is arranged on the cup base (2), and the cup base (2) connects the cup body (1) with the blade holder component (3), characterized in that, the blade holder component (3) comprises a blade holder (31) arranged right below the cup base and connected with the cup base; a handle (32) is vertically arranged on a bottom part of the blade holder; connecting members (33) are arranged on both ends of the handle; a locator (34) is arranged on the bottom part of the blade holder to locate a relative position of the handle relative to the blade holder; a connector (35) is arranged at a center of the locator, and the blade holder, the locator and the connector are coaxial; a guide bone (311) is arranged on an edge of the blade holder, and a rotary fastener (312) is arranged in the guide bone; on the rotary fastener, two opposing fastening members (313) are arranged; the connecting members at said both ends of the handle are connected with the rotary fastener, a guide slot (21) is arranged on an inner edge of the cup base to connect with the guide bone; in the guide slot, a convex button (22) is arranged for fastening the rotary fastener.

2. The blade holder assembly of claim 1, wherein a locating slot (314) is arranged on the edge of the blade holder, and on said locator, a locating bone (341) and a locating pole (342) are arranged which form a one-piece structure with the locator (34); the locating bone is engaged inside the locating slot, and the locating pole and the connecting members at the both ends of the handle are arranged inside the locating bone.

3. The blade holder assembly of claim 2, wherein four H-shaped fastening positions (344) for fixing are arranged on the bottom part of the blade holder, and on the locator (34), four engaging positions (343) are arranged to engage with the fastening positions.

4. The blade holder assembly of claim 3, wherein an engaging slot (23) is arranged in the cup base for connecting with the locating slot (314).

5. The blade holder assembly of claim 4, wherein the convex button (22) is polygonal, said fastening members are arranged on an edge of the rotary fastener, and inner edges of the fastening members (313) form-fit with an outer edge of the convex button (22).

6. The blade holder assembly of claim 1, wherein the blade holder component further comprises a screw (36) which fixes the rotary fastener on the blade holder.

7. The blade holder assembly of claim 6, wherein on two sides of the handle (32), two protrusions (37) are respectively arranged.

8. The blade holder assembly of claim 7, wherein on the blade holder (31), a blending blade (315) is arranged, and on an edge of a surface of the blade holder, a waterproof ring (316) is arranged.

\* \* \* \* \*